Feb. 21, 1928.
S. G. COOPER
1,659,858
END THRUST BEARING
Filed Jan. 27, 1927
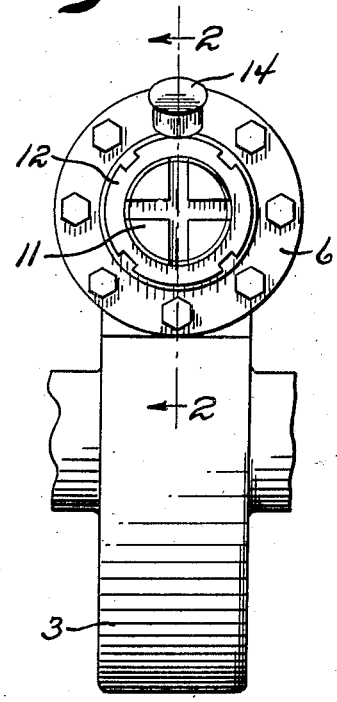
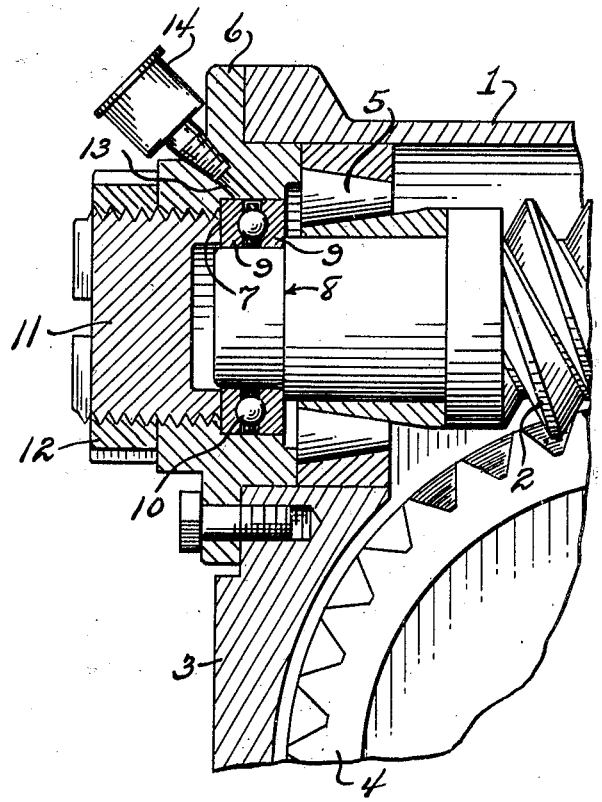
Sidney G. Cooper
INVENTOR
BY Victor J. Evans
ATTORNEY
WITNESS:

Patented Feb. 21, 1928.

1,659,858

UNITED STATES PATENT OFFICE.

SIDNEY G. COOPER, OF BATON ROUGE, LOUISIANA.

END-THRUST BEARING.

Application filed January 27, 1927. Serial No. 164,050.

This invention relates to an end thrust bearing for worm drives, the general object of the invention being to relieve the load on the ordinary bearings of the worm.

The invention is especially adapted for use in trucks having worm drives, but it will, of course, be understood that it can be used in other situations.

Another object of the invention is to provide means whereby the end thrust bearings can be lubricated.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing portion of a worm drive, with my invention in use thereon.

Figure 2 is a section on line 2—2 of Figure 1.

In these views, 1 indicates the housing of the worm shaft 2, and 3 indicates the housing of the worm gear 4, the anti-friction bearings at one end of the shaft 2 being shown at 5.

It is the object of my invention to relieve these bearings of the end thrust of the worm shaft which often causes said bearings 5 to burn up and sometimes to break the housing.

In carrying out my invention, I provide a closing plate 6 for one end of the housing 1, said plate being provided with an interior shoulder 7 and a shoulder 8 is formed on the end of the shaft 2 and between these shoulders I place the thrust bearings which consist of the race rings 9 bearing against the shoulders 7 and 8, and the balls 10 placed between the rings. The cover plate has a threaded opening therein which is engaged by an adjusting nut 11 which has its inner end arranged to engage the bearing so that the bearing can be adjusted, as will be understood. This nut is locked in adjusted position by means of the lock nut 12.

An oil passage 13 is formed in the cover plate 6 and is arranged to conduct lubricant on to the bearings 10. A cup 14 is threaded in the outer part of the passage to contain the lubricant.

From the foregoing it will be seen that I have provided simple means for positioning end thrust bearings at the end of a worm shaft to take the end thrust thereof, with means for adjusting the bearing without removing any parts and also to provide means for lubricating the bearings.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a worm shaft and its housing and anti-friction bearings between the end of the shaft and the housing, a shouldered cover plate at one end of the housing, the shaft having a reduced end forming a shoulder, ball races placed against the shoulders on the cover plate and the shaft, said races surrounding the reduced end of the shaft, balls between the races, an adjusting nut carried by the cover plate for adjusting the bearings and means for locking the nut in adjusted position.

In testimony whereof I affix my signature.

SIDNEY G. COOPER.